United States Patent
Born et al.

(10) Patent No.: US 6,522,951 B2
(45) Date of Patent: Feb. 18, 2003

(54) METHOD AND DEVICE FOR CONTROLLING A ROBOT

(75) Inventors: Hans Born, Augsburg (DE); Johannes Stelter, Gilching (DE); Bernhard-Michael Steinmetz, Kellheim (DE); Jens Bunsendahl, Augsburg (DE); Ralf Koeppe, Seefeld (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 09/733,557

(22) Filed: Dec. 8, 2000

(65) Prior Publication Data

US 2002/0002424 A1 Jan. 3, 2002

(30) Foreign Application Priority Data

Dec. 9, 1999 (DE) .......................... 199 59 330

(51) Int. Cl.[7] .............................. G05B 19/00
(52) U.S. Cl. ................ 700/258; 700/245; 700/249; 700/251; 700/253; 700/257; 700/259; 700/260; 700/264; 318/568.1; 318/568.2; 318/573; 701/4; 701/23; 901/15; 901/19; 340/870.16; 340/870.31
(58) Field of Search ................. 700/17, 11, 56, 700/83, 86, 245, 253, 249, 250, 251, 259, 260, 264, 192, 186, 257; 318/568.1, 268.2, 573; 701/23, 4, 29; 901/15, 19; 703/18, 20; 340/870.16, 870.31

(56) References Cited

U.S. PATENT DOCUMENTS

| | | | | |
|---|---|---|---|---|
| 4,503,507 A | * | 3/1985 | Takeda et al. | 318/568.2 |
| 4,975,865 A | * | 12/1990 | Carrette et al. | 700/10 |
| 5,433,115 A | * | 7/1995 | Spillman et al. | 73/773 |
| 5,581,248 A | * | 12/1996 | Spillman et al. | 324/769 |
| 5,602,540 A | * | 2/1997 | Spillman, Jr. | 340/870.31 |
| 5,703,576 A | * | 12/1997 | Spillman et al. | 340/870.16 |
| 5,956,465 A | * | 9/1999 | Takagi et al. | 703/20 |
| 6,243,665 B1 | * | 6/2001 | Nagoya et al. | 703/20 |

OTHER PUBLICATIONS

Chen et al., Task planning and action coordination in integrated sensor-based robots, 1995, IEEE, pp. 569–591.*

Kubitz et al., Client-server-based mobile robot control, 1998, IEEE, pp. 82–90.*

Kamon et al., Range-sensor based navigation in three dimensions, 1999, IEEE, pp. 163–169.*

Berger et al., A modular, layered client-server control architecture for autonomous mobile robots, 1997, IEEE, pp. 697–710.*

* cited by examiner

Primary Examiner—William A. Cuchlinski, Jr.
Assistant Examiner—McDieunel Marc
(74) Attorney, Agent, or Firm—McGlew and Tuttle, P.C.

(57) ABSTRACT

A method and a device for controlling a robot on the basis of data from sensors with their own sensor data structures. For solving the problem of adapting to different sensors and their data structures and consequently permitting in simple manner the use of different sensors without intervening in the actual robot control program, according to the system the sensor data are processed to robot control data with a control data structure usable by a system control program and a processing device suitable for the same is provided.

25 Claims, 13 Drawing Sheets

Programming sequence of a simple sensor application

| File | Processing | Config. | Display | | Technolog. | Instructions | Assistance |
|---|---|---|---|---|---|---|---|

```
15
16    INITSDB ( )                                              100%
17    SDBON ( )
18    BAS ( #INITMOV,0 )
19    PTP  HOME|
20
21
22
23
24
25

26
27
28
29
30
31                                                              7
32
33    SDBOFF ( )
```

| Time | No. | Para. | Message |
|---|---|---|---|
| 13:53 | 1356 | KCP | Starting key necessary |
| 14:00 | 4 | TPBASIS | P1 automatically applied |
| 14:02 | 2047 | KCP | Object not present |
| 14:02 | 0 | | Zu viele Zeilen |
| | | | Too many lines |

NUM        S  I  R    SENTEMPL  Satz=28  T2        POV=100%  14:04

Amend | Movement | Logic | Last instru. | Frame selection | Touch Up | File

Empty program part

Fig 6a

| File | Processing | Config. | Display | | Technolog. | Instructions | Assistance |

```
 15
 16    INITSDB ( )
 17    SDBON ( )
 18    BAS ( #INITMOV,0 )
 19    PTP  HOME|
 20
 21
 22
 23    New Sensor: KraftY    Source: FY
 24
 25

26
 27
 28
 29
 30
 31
 32
 33    SDBOFF ( )
```

100%

2

7

| Time | No. | Para. | Message |
|---|---|---|---|
| ⓘ 13:53 | 1356 | KCP | Starting key necessary |
| ⓘ 14:00 | 4 | TPBASIS | P1 automatically applied |
| ⓘ 14:02 | 2047 | KCP | Object not present |
| ⓘ 14:02 | 0 | | Zu viele Zeilen |
| | | | Too many lines |

NUM        S | R    SENTEMPL  Satz=28  T2        POV=100%  14:04

| Amend | Movement | Logic | Last instru. | Frame selection | Touch Up | File |

Applying a sensor called KRAFTY

Fig 6b

Applying a more complex sensor: path-accompanying recording of force in X direction of connected DLRFT-type sensor

Fig 6c

| File | Processing | Config. | Display | | Technolog. | Instructions | Assistance |
|---|---|---|---|---|---|---|---|

```
15
16      INITSDB ( )
17      SDBON ( )
18      BAS ( #INITMOV,0 )
19      PTP  HOME
20
21
22
23      New Sensor: KraftY    Source: FY
24      New TTS Sensor: TTSFX   Source: DLRFT   Out:  FX
```

New Condition: [StopOnForce] If [KraftY ▼] [Greater ▼] [30 % then
Stop Normal                              ▼]

```
27
28
29
30
31
32
33      SDBOFF ( )
```

| | Time | No. | Para. | Message |
|---|---|---|---|---|
| ⓘ | 13:53 | 1356 | KCP | Starting key necessary |
| ⓘ | 14:00 | 4 | TPBASIS | P1 automatically applied |
| ⓘ | 14:02 | 2047 | KCP | Object not present |
| ⓘ | 14:02 | 0 | | Zu viele Zeilen |

Too many lines

NUM        S  I  R    SENTEMPL  Satz=28  T2        POV=100%  14:04

| Amend | Movement | Logic | Last instru. | Frame selection | Touch Up | File |

A reaction condition is reapplied under "Stop on force". If the recorded force value is Y exceeds 30% of the maximum value, the robot stops immediately.

Fig 6d

| File | Processing | Config. | Display | | Technolog. | Instructions | Assistance |
|---|---|---|---|---|---|---|---|

```
15
16      INITSDB ( )
17      SDBON ( )
18      BAS ( #INITMOV,0 )
19      PTP  HOME|
20
21
22
23      New Sensor: KraftY   Source: FY
24      New TTS Sensor: TTSFX   Source: DLRFT   Out:  FX
25      New Condition: StopOnForce  If  KraftY Greater 30 % then
        └ Stop Normal
26      LIN P1  vel= 2 m/s  CPDAT1
27
28
29
30
31
32
33      SDBOFF ( )
```

| | Time | No. | Para. | Message |
|---|---|---|---|---|
| ⚠ | 13:53 | 1356 | KCP | Starting key necessary |
| ⚠ | 14:00 | 4 | TPBASIS | P1 automatically applied |
| ⚠ | 14:02 | 2047 | KCP | Object not present |
| ⚠ | 14:02 | 0 | | Zu viele Zeilen |
| | | | | Too many lines |

NUM           S  I  R    SENTEMPL  Satz=28  T2         POV=100%  14:04

| Amend | Movement | Logic | Last instru. | Frame selection | Touch Up | File |

A normal movement is inputted (standard inline form). The previously generated monitoring is already active during this movement.

Fig 6e

| File | Processing | Config. | Display | | Technolog. | Instructions | Assistance |
|---|---|---|---|---|---|---|---|

```
15
16    INITSDB ( )
17    SDBON ( )
18    BAS ( #INITMOV,0 )
19    PTP HOME|
20
21
22
23    New Sensor: KraftY   Source: FY
24    New TTS Sensor: TTSFX   Source: DLRFT   Out:  FX
25    New Condition: StopOnForce If  KraftY Greater 30 % then
      ↳ Stop Normal
26    LIN P1  vel= 2 m/s CPDAT1
27    Del Condition: StopOnForce
28
29
30
31
32
33    SDBOFF ( )
```

| | Time | No. | Para. | Message |
|---|---|---|---|---|
| ⓘ | 13:53 | 1356 | KCP | Starting key necessary |
| ⓘ | 14:00 | 4 | TPBASIS | P1 automatically applied |
| ⓘ | 14:02 | 2047 | KCP | Object not present |
| ⓘ | 14:02 | 0 | | Zu viele Zeilen |

Too many lines

NUM        S | R    SENTEMPL  Satz=28 T2      POV=100% 14:04

| Amend | Movement | Logic | Last instru. | Frame selection | Touch Up | File |

This instruction deactivates the monitoring (inline form not shown)

Fig 6f

| File | Processing | Config. | Display | | Technolog. | Instructions | Assistance |
|------|-----------|---------|---------|---|-----------|--------------|------------|

```
15
16      INITSDB ( )
17      SDBON ( )                                                    100%
18      BAS ( #INITMOV,0 )
19      PTP  HOME
20
21
22
23      New Sensor: KraftY    Source: FY
24      New TTS Sensor: TTSFX    Source: DLRFT    Out:  FX
25      New Condition: StopOnForce  If  KraftY Greater 30 % then
     ↳  Stop Normal
26      LIN P1   vel=  2 m/s  CPDAT1
27      Del Condition: StopOnForce
28      Del Sensor:  KraftY
29
30
31                                                                     7
32
33      SDBOFF ( )
```

| | Time | No. | Para. | Message |
|---|------|-----|-------|---------|
| ⊙ | 13:53 | 1356 | KCP | Starting key necessary |
| ⊙ | 14:00 | 4 | TPBASIS | P1 automatically applied |
| ⊙ | 14:02 | 2047 | KCP | Object not present |
| ⊙ | 14:02 | 0 | | Zu viele Zeilen |
| | | | | Too many lines |

NUM          S | R    SENTEMPL  Satz=28  T2          POV=100%  14:04

| Amend | Movement | Logic | Last instru. | Frame selection | Touch Up | File |

The sensor is no longer needed and therefore cancelled

Fig 6g

| | |
|---|---|
| INITSDB ()<br>SDBON()<br><br>VSENS=NEWOBJ(VIRTSENS, 0)<br>ONSW=NEWOBJ(ONSWITCH, 0)<br>MAPVAR=NEWOBJ(MAPTOVAR, 1)<br>GRSW=NEWOBJ(GRSWITCH, 30000)<br><br>STNORM=NEWOBJ(STOPNORMAL, 0)<br><br>NEWLINK(1001, VSENS)<br>NEWLINK(VSENS, ONSW)<br>NEWLINK(ONSW, MAPVAR)<br>NEWLINK(VSENS, MAPVAR)<br><br>NEWLINK(VSENS, GRSW)<br>NEWLINK(GRSW, STNORM) | Init:<br>-Sensortask initiate<br>Sensortask activate<br>APPLY OBJECTS<br><br>- virtual Sensor<br>- Always on Switch<br>- Fade in variable<br>- larger then switch<br>(Threshold 30000)<br>- Action stop<br> Apply connections<br>- Sensor -> virt. Sensor<br>- virt. Sens -> switch<br>- switch -> fade in variable<br>- virt. Sens. -> fade in variable<br><br>virt. Sens -> switch<br>      -> Stop |

METHOD AND DEVICE FOR CONTROLLING A ROBOT

FIELD OF THE INVENTION

The invention relates to a method and a device for controlling a robot on the basis of sensor data from sensors with their own sensor data structures.

BACKGROUND OF THE INVENTION

It has only hitherto been possible with considerable effort and expenditure to use different sensors and sensor groups in a robot control. Admittedly, like the robot control, different sensors largely use substantially standardized hardware interfaces, but they have their own and in particular different data structures. Consequently the robot control must be adapted to different data formats and structures, transmission protocol and speeds of the particular sensor. In addition, known robot controls usually only have fixed implemented intervention possibilities for sensor data on the robot program. The adaptation to new sensors and the creation of new action mechanisms can only be carried out by the manufacturer, which generally requires a modification of the system software. As such changes intervene deeply into the system programs, extensive tests are required in order to ensure security. Adaptations on the user plane with the aid of existing communications interfaces usually do not satisfy the speed requirements of the process to be influenced. Thus, in connection with the connecting in of complex sensors, frequently a choice is made of the alternative of additional, external and expensive computer hardware.

For example, fixed implemented software interfaces for visual sensors or path-following sensors are known. However, such implementations are usually tailor-made to specific sensor types and makes and are consequently not flexible with respect to the protocol or with respect to the further processing of the data.

On the basis of this the problem of the invention is to provide a method and a device for controlling a robot in such a way that, without intervention in the actual robot control program, an adaptation is possible to different sensors and consequently in simple manner different sensors can be used.

SUMMARY OF THE INVENTION

According to the invention the set problem is solved by a method for controlling a robot of the aforementioned type in which the sensor data are processed to robot control data of a control data structure usable by a control program. A device for solving the set problem is constructed in such a way that a processing means for processing sensor data to robot control with a control data structure usable by a control program is provided.

To obtain the possibility of flexible cooperation of a robot control, equipped with its standard hardware interfaces, with different sensors, which admittedly have standard hardware interfaces, but supply specific data in specific formats, the invention consequently provides that the robot control is put into a position by the introduction of a user-configurable sensor data processing layer, to process, particularly standardize and convert, specific sensor data in such a way that after passing through this layer they can be readily further processed by the control program. Sensor data can in particular be combined in a random manner and then supplied to the system program for initiating actions.

Through the processing layer provided between the sensors and the robot control program according to the invention for the provision of control program-processable control data adapted thereto, it is possible to use the most varied sensors in a robot with the same control or system program, without it having to be modified per se. Thus, when using different sensors no intervention in the control program is necessary. The processing of the sensor data can take place in modular manner, so that easy configuration for adapting to different sensors by the user is possible. In particular, the processing of sensor data by the user can be configured by the declaration, linking and parametrizing of predefined functional blocks. The linking and parametrizing of the functional blocks more particularly takes place in such a way that the resulting structure does not impair the security functions of the system program. In this way it is also possible to modify the structures during the running time of a robot application by event-controlled switching. For this purpose, in preferred manner the invention provides that the sensor data are converted into check data with a uniform data structure, that the check data are processed by processing operations to actuator data and that the actuator data are monitored, optionally limited and transferred as robot control data to the robot control program. Since for the control of a robot not only external sensor data are used, but also internal data of the actual robot control, according to a preferred development of the invention it is proposed that internal data of the robot control are converted into check data with a uniform data structure, the check data structure being identical to the structure of the external sensor data. Thus, the internal data are represented as data of pseudo-sensors.

Thus, in this way different sensors can be easily fixed in the robot control without requiring an intervention in the actual control program, so that security risks are minimized and the test expenditure associated with changes is reduced. The invention makes it possible to use existing interfaces of sensors and program.

Whilst the clock cycle of the processing (reading clock) can fundamentally be determined by external events, one or more internal timers can be provided and in particular in the case of sensor, check, actuator and/or robot control data an averaging and/or filtering can be performed. If there is a subsequent process with a lower clock rate, according to a preferred development when processing sensor, check, actuator and/or robot control data, an averaging and/or filtering is performed. This leads to an effective interference suppression.

According to a further development, it can in particular be provided that sensor data of several sensors are processed in parallel and/or that several processing paths are provided for the parallel processing of sensor data of one sensor by means of different evaluation strategies and in particular the data obtained according to a specific evaluation strategy are transferred to the control program, as a function of specific events, for use by the latter.

The operation of a sensor with several evaluation strategies is particularly appropriate if the evaluation strategies differ to such an extent that it is no longer possible to implement the necessary switching operations in a single signal processing path. In this case two or more independent strategies are programmed in separate signal processing paths. Another important application for planned selectable strategies is error handling, which requires different procedures such as e.g. sensor initiation, program stop, calling new programs or suppressing actions. For the selection of a strategy the in each case associated signal processing path is activated and the unused paths deactivated. For activation purposes it is possible to use the indicated events: program flow, such as start/stop, operating mode change or program instruction, variables such as the value of system variables or user variables, interface data such as the state of binary I/Os, analog I/Os, serial interfaces or parallel interfaces.

Within the scope of the invention, e.g. in the case of a control unit, on the basis of the check data received a control process is carried out as a function of a condition.

As a result of the invention it is possible to use sensors for the most varied problems, e.g. force-moment sensors, which detect contacts of the robot arm at undesired points and/or with inadmissibly high forces, i.e. sensors which as a result of the measurement of the gripper weight establish whether an object gripped by it remains hanging on the gripper following the opening and return of the same. It is also possible to use sensors permitting a sorting of workpieces on the basis of their weight, this taking place through the presetting of thresholds. Other usable sensors establish by a combined path and force measurement, whether a plug and a counterpart have in fact been correctly and completely engaged by the robot. It is possible to use sensors for monitoring load tests, e.g. for checking adhesion or bonding points, which monitor the force and path with respect to exceeding predetermined thresholds. In the same way it is possible to use sensors, which e.g. monitor the tension when drawing in cables, where an exceeding thereof would damage or completely destroy the cable. Whereas in this case a force monitoring in the tension direction is needed, this would be appropriate at right angles to the movement direction in cutting production processes, in order to guarantee constant cutting forces. Further uses for sensors on a robot are the tracking of a predetermined contour, such as a groove.

BRIEF DESCRIPTION OF THE DRAWINGS

Further advantages and features of the invention can be gathered from the following description of an embodiment of the invention with reference to the attached drawings, wherein show.

DETAILED DESCRIPTION OF THE DRAWINGS

Figure 1:
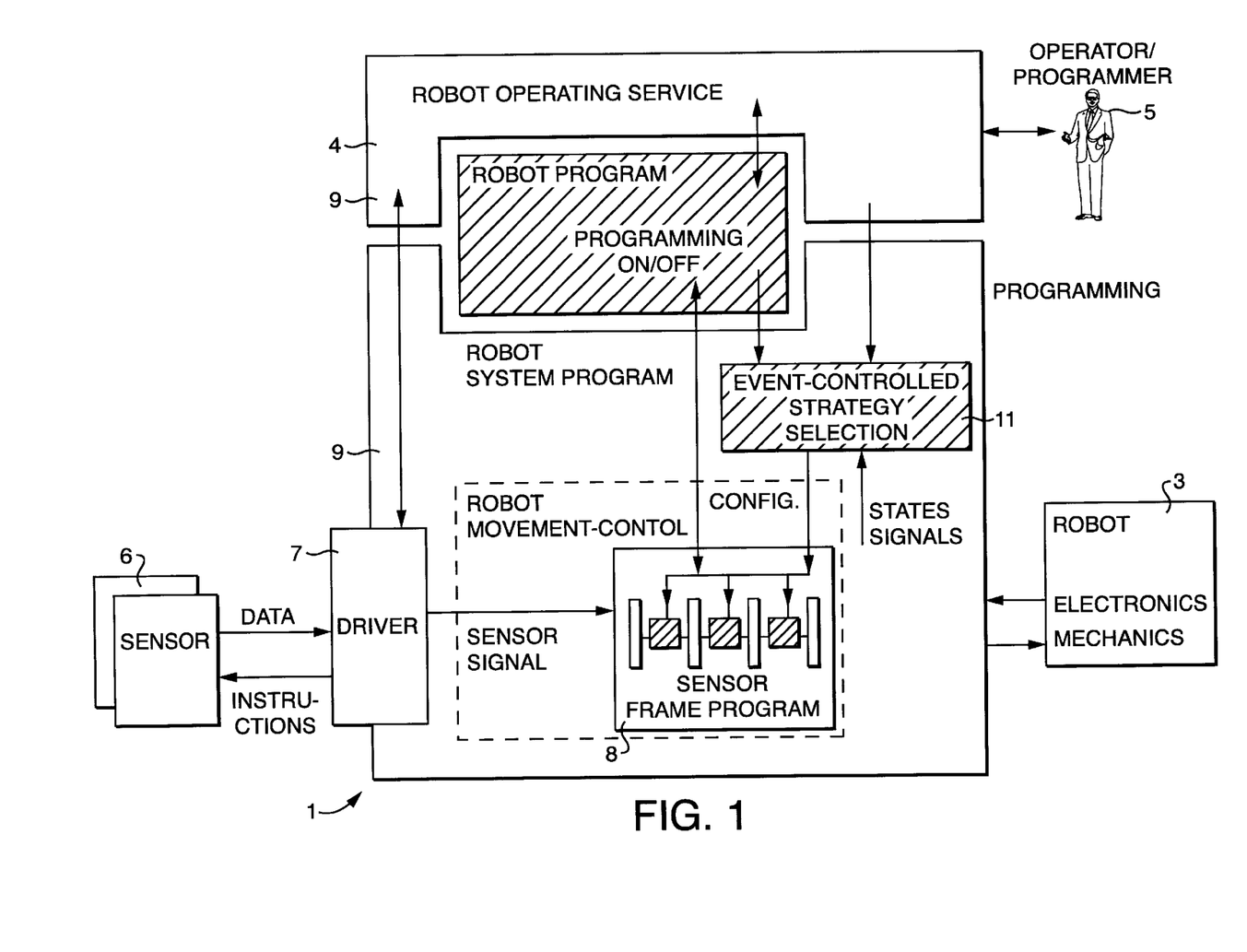
FIG. 1 The fixing of a sensor program implementing the invention in the complete robot control software.

The essence of the robot control 1 is a robot system or control program 2, which controls the robot 3. The control program 2 can be operated by a user 5 by means of an operating surface 4 and receives input data from sensors 6 by means of drivers 7. According to the invention, between the sensor drivers 7 and the control program 2 is provided an independent sensor data processing layer in the form of a sensor frame program 8, which is influenceable on the one hand by means of the user application program, which controls the robot movements and on the other by means of a unit 11 for event-controlled strategy selection on the basis of the states and signals which occur. User application programs, event-controlled strategy selections 11 and sensor programs in the sensor frame program 8 can be programmed by the user 5.

Figure 2:
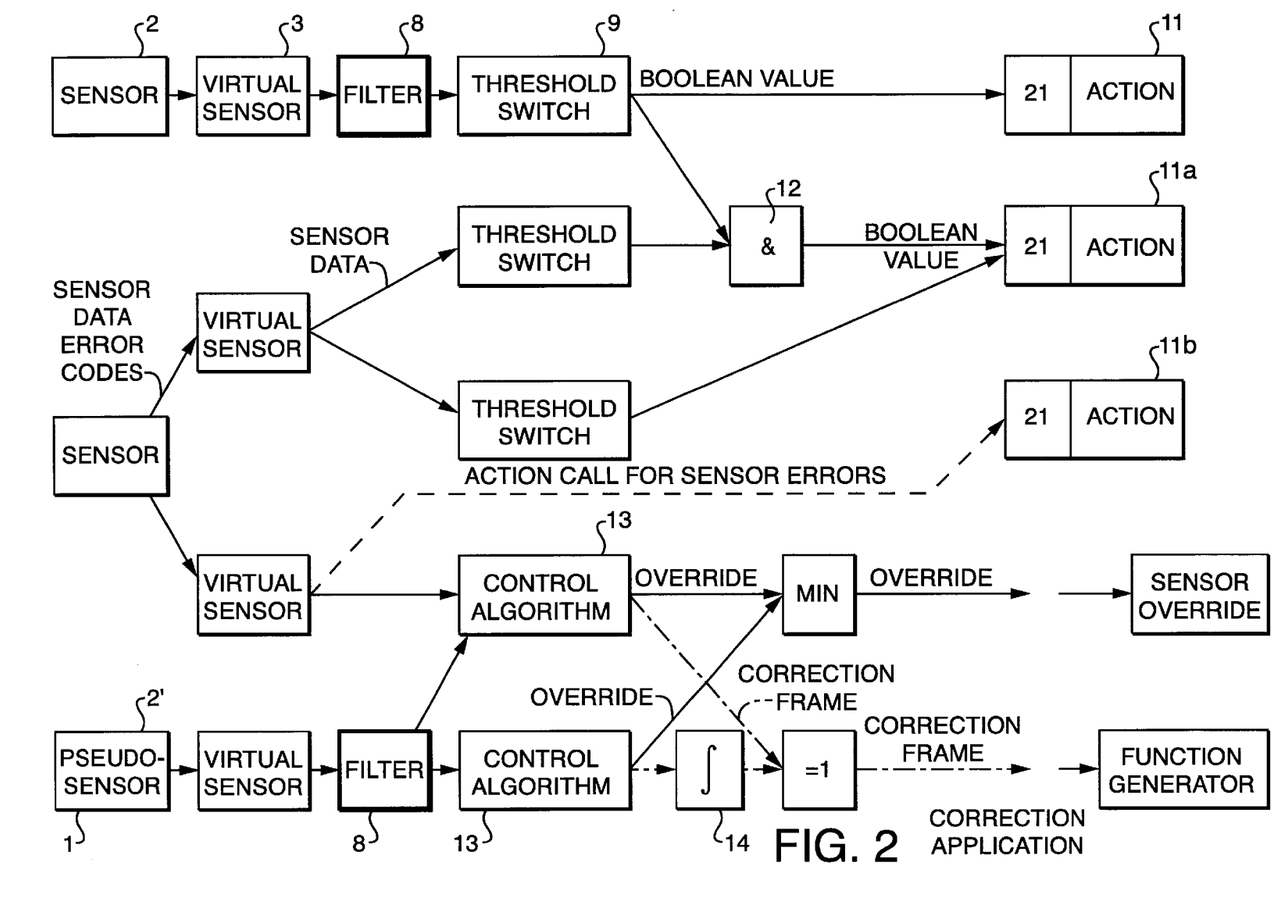
FIG. 2 A diagrammatic representation of an inventive control of the sequence of a robot.

The operating sequence of the control according to the invention for a robot is shown in FIG. 2. As stated, the control 1 according to the invention has sensors 2 of different types, which output data having their own, different data structure. The sensor data can optionally initially be standardized. The sensors supplying the data may also include pseudo-sensors 2', which do not transfer true, measured sensor data, but instead system data of the robot control corresponding to the format of sensor data and which are made available in the control for further use in the same way as the sensor data.

The sensors 2 are followed by the actual converting devices 13, which can also be called "virtual sensors", because the robot control program looks upon the data transferred to it by the converting devices as sensor data appropriate for it, i.e. only sees the converting device as an upstream, virtual sensor.

The converting device 3 provided according to the invention reads in sensor data and error codes. The converting device 13 incorporates a conversion unit, such as e.g. a coordinate transformation unit. In addition, various input sensor values are linked, optionally to a result, which only comprises a single value, which in an adapting unit is multiplied with a preselectable value or can be additively provided with an offset. The output value is then transferred for further use to the control program. A test facility for checking the error code can give rise to a clearly defined action in the case of an error.

The converting devices 13 can be followed by filters 14. The output data of the converting devices 13 can in a first alternative be supplied by means of a threshold switch 15 in the form of a Boolean value to the control program. The threshold switch 15 operates with the data supplied to it by the converting device. Thus, the threshold switch 15 defines a higher than, lower than condition, which is constantly checked by it, the reference value of the condition being variable in order to be able to easily vary the sensitivity. A threshold switch has only a single input. The output signal of the threshold switch determines whether the control program implements a control process or an action.

Additionally or alternatively output values of the threshold switches can be linked together by a linking unit 16. In this way complex switching conditions can be created. Whilst the linking unit 16 is connected on the input side to several switches or also preceding links, on the output side it can be provided with a control process or also links. A linking unit 16 can also be connected to itself. As a rule the linking unit contains a fixed link, which is cyclically evaluated and whose result is made available to the following elements.

Within the scope of the control according to the invention it is also possible to provide control units 17. They receive data from one or more converting devices 13 and from them is determined a correction offset and/or override for corresponding a position (offset) or for the multiplicative influencing of the movement speed of the robot (override). It is possible to provide several controllers 17. One controller 17 can be followed by an integrator 18, which integrates the correction frames received from the controller 17. The output values of the controller 17 are taken over once again directly or indirectly via the integrator for performing control functions by the control program. The latter defines the actual function performed by the robot. This can extend from stopping the robot to setting an output.

Figure 3:
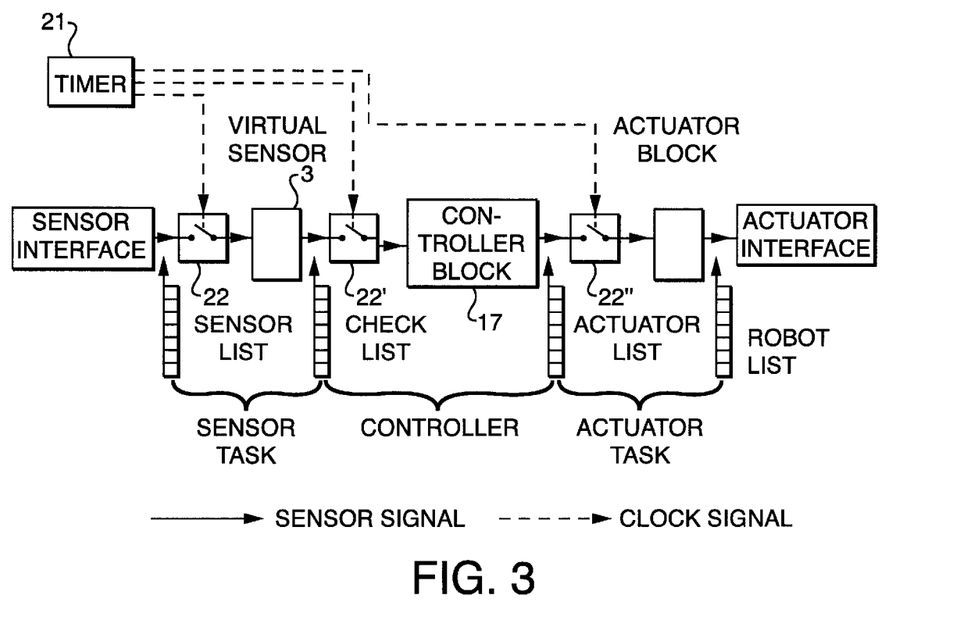
FIG. 3 A processing path for data of a sensor.

The sequence of the method according to the invention is represented by means of a processing path in FIG. 3. Processing is controlled by a timer 21, which predetermines by a clock cycle the times for taking over data and this is represented in FIG. 3 by the switches 22, 22', 22''. The taking over of data can be initiated by external events.

The data made available by the sensor in the sensor list are standardized in a converting device 13, i.e. the virtual sensor. The latter has for this purpose functional components, which can be linked in network-like manner by user programming. The functions can contain operators, such as basic calculation modes, squaring and evolving routes, as well as Boolean operators, together with filters, such as high, low and band-pass filters, averaging, and finally transformations for frame arithmetic and matrix multiplication. The virtual sensor 3 provides the processed sensor data in the form of check data in a check list. The latter contains a data structure with the "type" for describing the origin of the sensor signals and identifying the sensor type, "dimension" for giving the unit of the signal in SI units (e.g. Nm), "dim factor" with which the signal value is multiplied in order to obtain the signal value in the desired SI unit, "value" as the actual sensor value, "time" for defining the time of signal generation in the sensor (time stamp) and "enabled" for establishing whether the associated value will or will not be further processed. If control-internal data are required for processing, they are, in the same way as sensor data, represented as pseudo-sensor data.

The check data of the check list are also processed in timed manner, the clock cycle of the switch 22' possibly differing from that of the switch 22 (and that of the switch 22'') and are taken over by the control unit 17. The latter can have functional blocks for implementing Boolean operations (AND, OR, XOR, NOT), control functions such as 2-point and 3-point controllers, P controllers, integrators, PID controllers, as well as comparison and switching functions such as comparators with or without hysteresis and further functions for delay, limiting, integration, differentiation and nonlinear characteristics.

Figure 4:
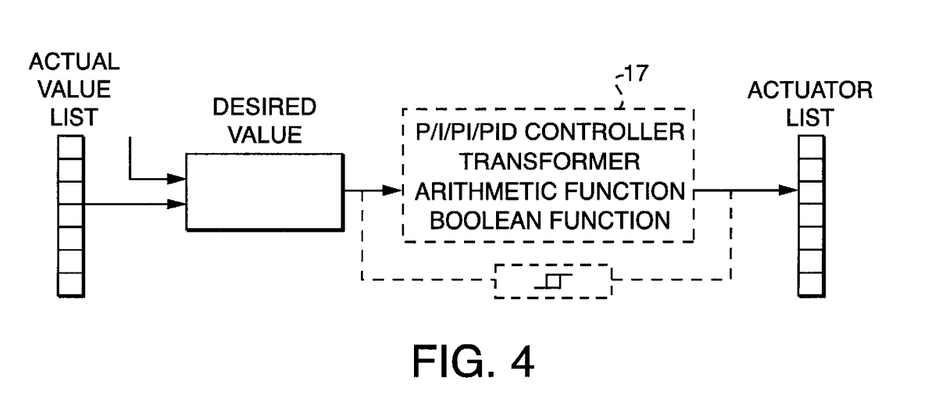
FIG. 4 A larger scale, diagrammatic view of the control unit with its given functions.

FIG. 4 shows the control unit 17 with its signal processing sequence with exemplified indication of functional blocks. The actual control process is preceded by a desired-actual value comparison.

Figure 5:
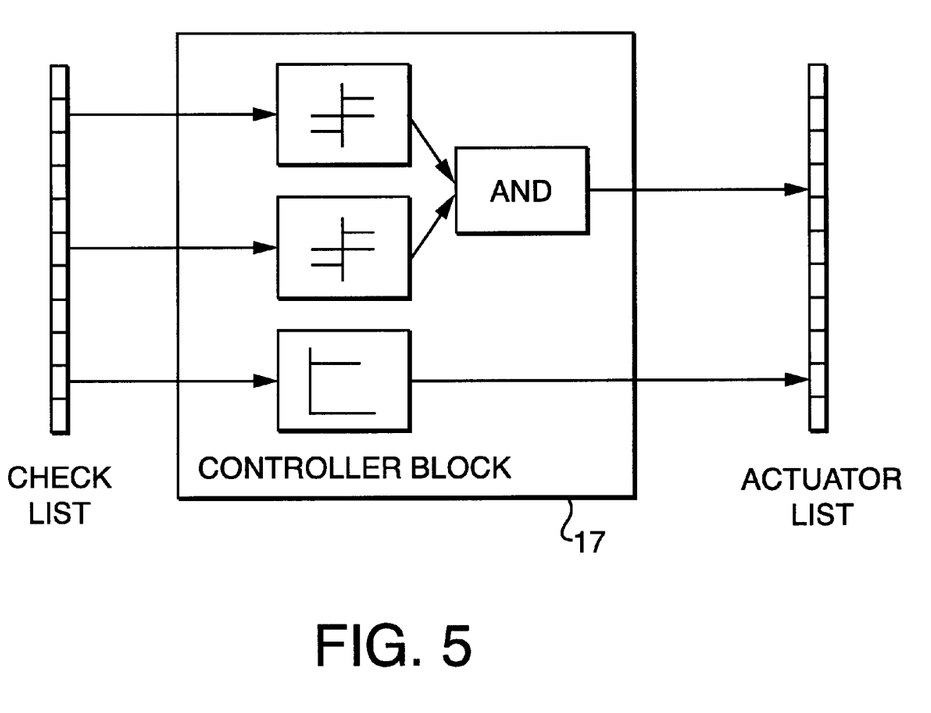
FIG. 5 A diagrammatic representation of a data processing process in a control unit.

A specific embodiment of the processing in the control unit is shown in FIG. 5.

The values or data of the control unit 17 are made available as result values in an actuator list of an actuator unit 23, which reads the result values of the control unit 17 made available in the actuator list at fixed times, subjects the data to a check of the value range in the sense of a plausibility check and, if necessary, effects a conversion and if necessary limitation and finally transfers same to the control or system program 2 of the robot in the form of a robot list for effecting robot control actions.

These control actions can comprise a sequence control of the robot with start or stop, branches in the program sequence and the selection and starting of specific program components, movement controls such as position offset,, force impression or override, and finally a general data management for updating variables.

As can be gathered from FIG. 2, it is possible to have a parallel operation of the data of several sensors, which can have the same or a different construction. As is also apparent from the branches in FIG. 2, the evaluation of the data of a sensor can take place in several different evaluation strategies and as a function of the events occurring in the program sequence, the values of variables or interface data, one or other signal processing path is activated and that or those not used deactivated. Evaluation strategies can be combined and also an error handling can be performed.

Thus, with the method sequence according to the invention initially data of sensors 2 are read out, optionally also the pseudo-sensor 2' is taken over and conversion thereof can take place. The standardized data are then further processed, in that a check is made to establish whether they pass above or drop below preset thresholds, are interlinked or subject to a control process. This can easily be programmed by the user adapting to the sensor or sensors provided without intervention being necessary in the actual robot control program. On the basis of the data taken by the control program from the robot list, the latter optionally implements suitable control operations for the robot.

In the case of the implementation of sensor-specific program files, as a result of the invention it is no longer necessary to carry out operational and security testing of the control software. Programming shortcomings in the program parts relating to sensor adaptation may admittedly under certain circumstances lead to an incorrect behaviour, but not to security risks, because no intervention has taken place in the actual robot control or system program and in the described manner completely tested modules with complete error handling can be used. The programming of tasks in the sensor frame program and strategy selection can take place both with operator guidance and in an expert mode. In the first case a user without relevant EDP and programming knowledge, can carry out the programming of the sensor data evaluation whilst introducing his knowledge of the working process to be performed. In this user mode he can use forms for fixing functional modules and can be requested to input the necessary parameters in preset input areas. Simultaneously the value range is monitored and a plausibility check carried out. The integrity of the security functions of the control or system software of the robot is maintained in all cases.

Figure 6A:
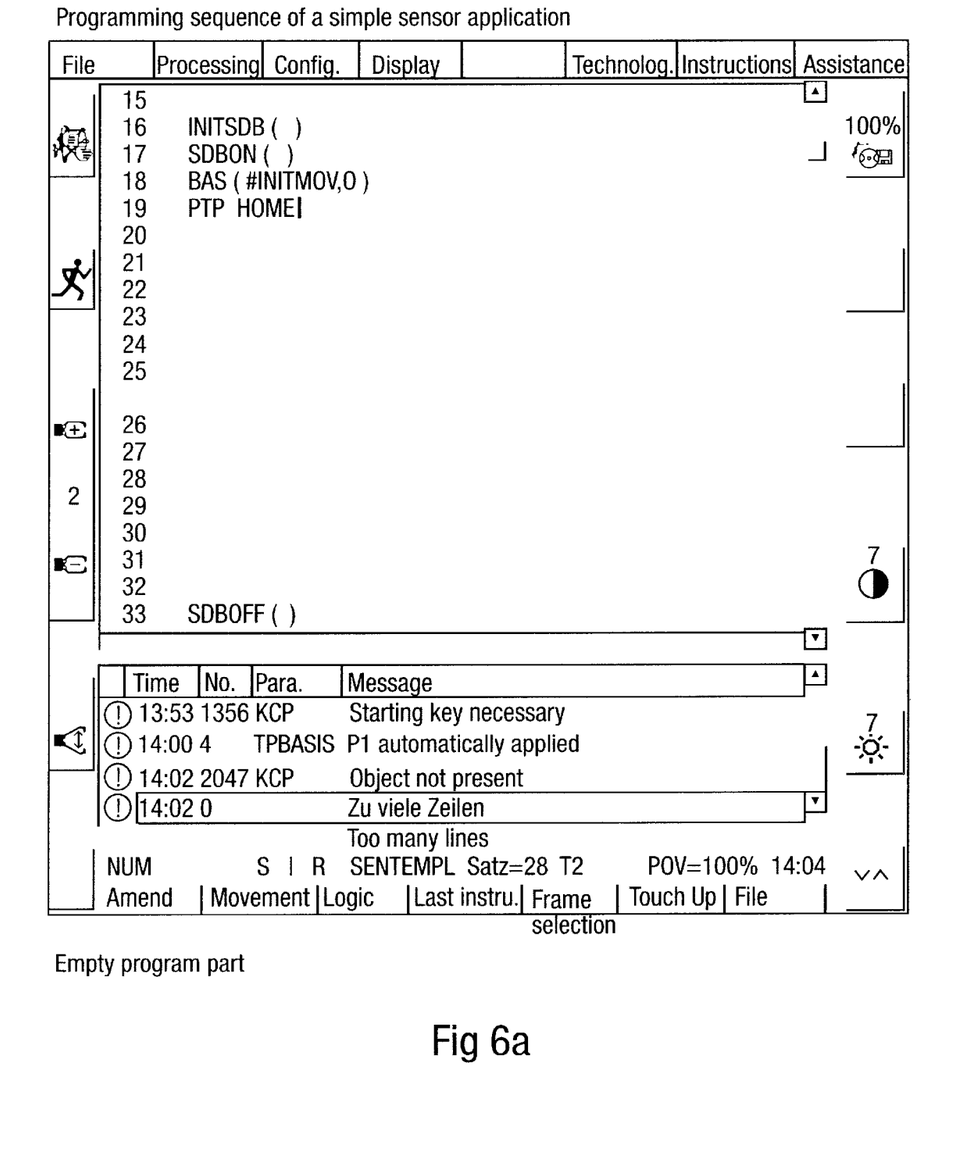
FIGS. 6a–6g Screen printouts for programming a virtual sensor by means of online forms by a user.
Figure 6B:
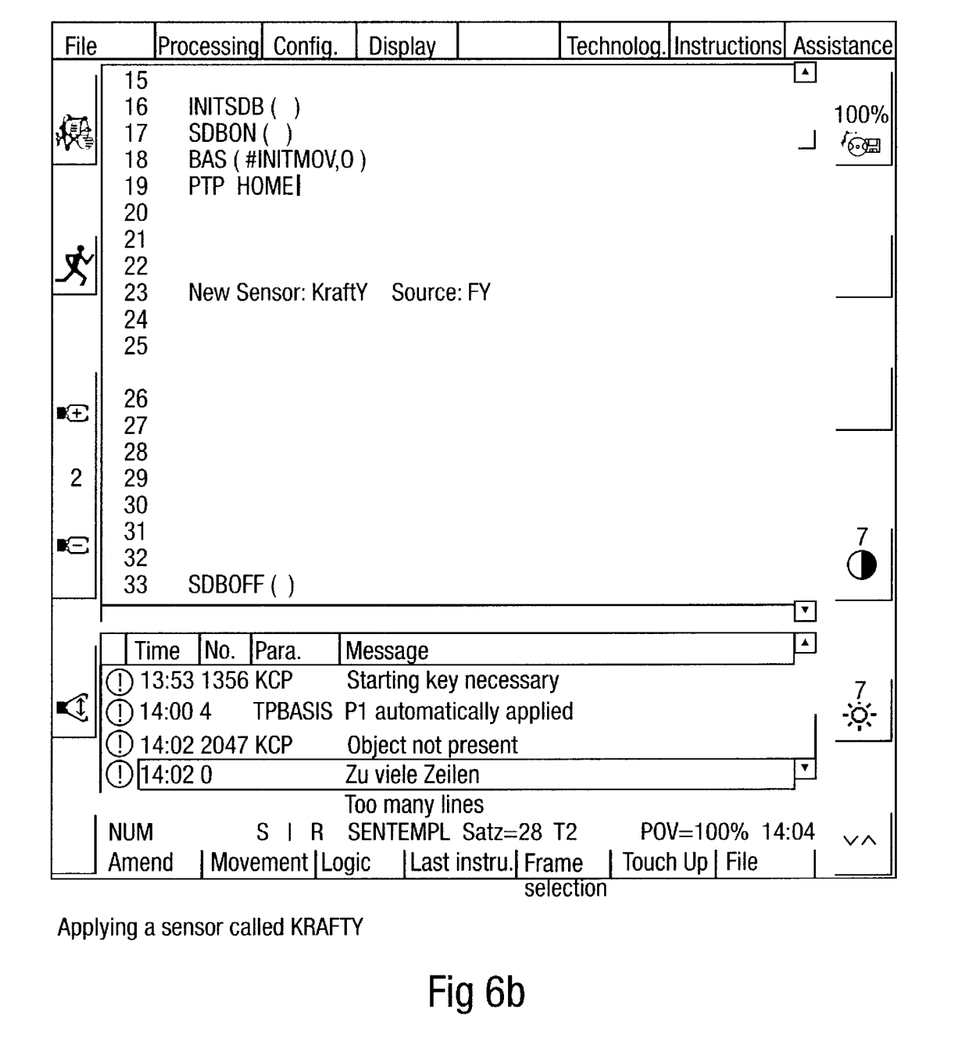
Figure 6C:
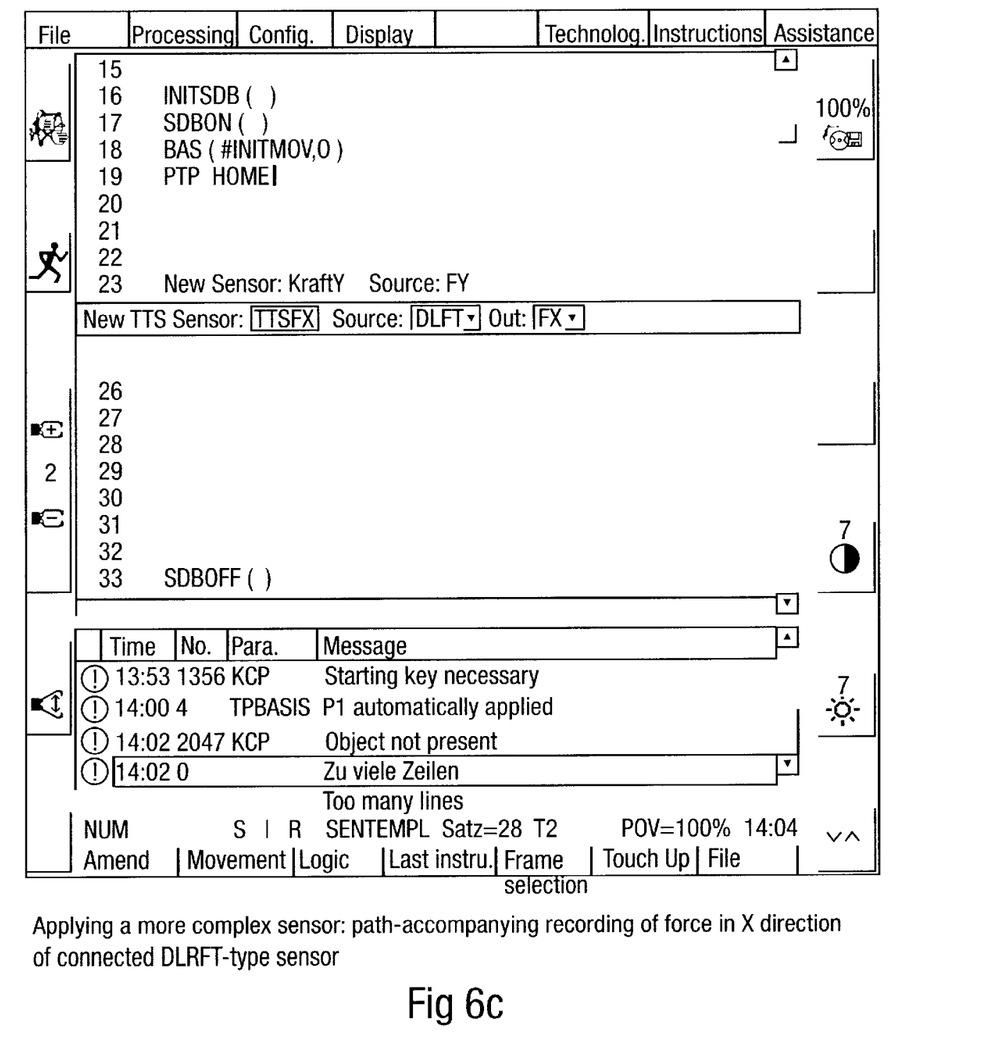
Figure 6D:
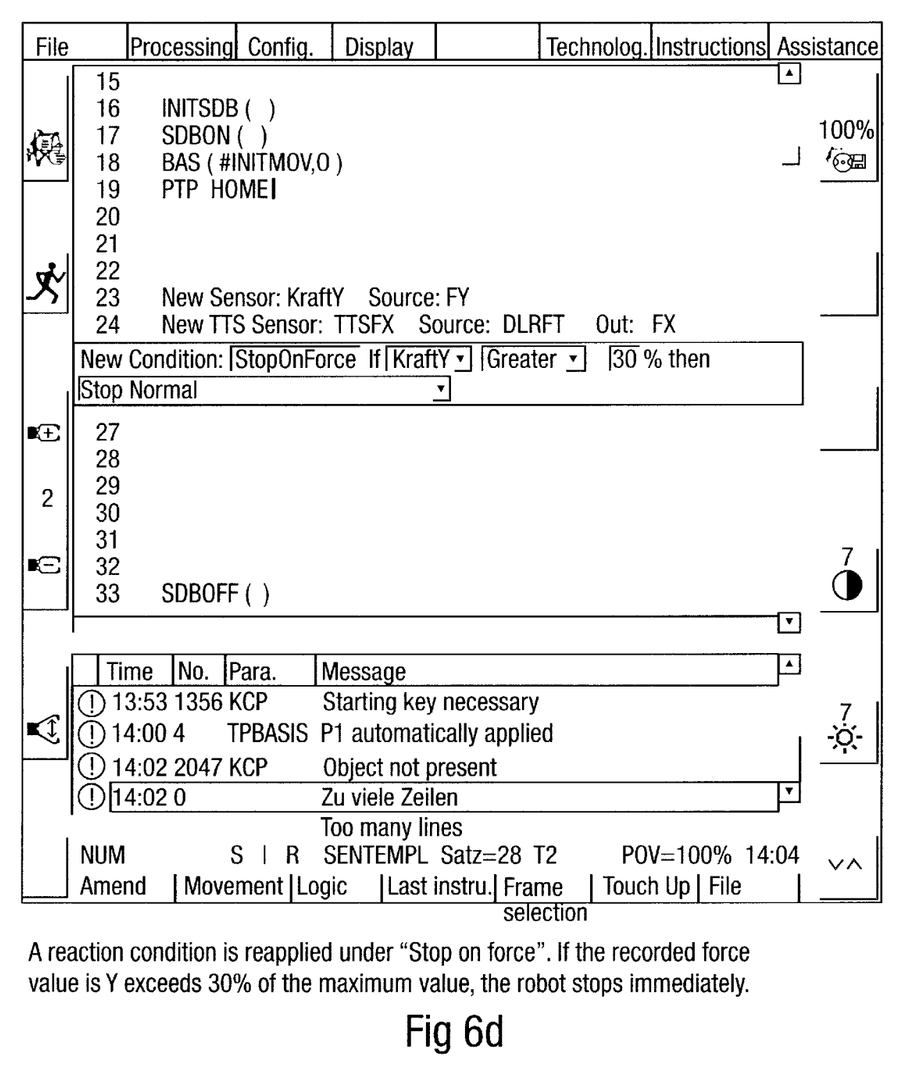
Figure 6E:
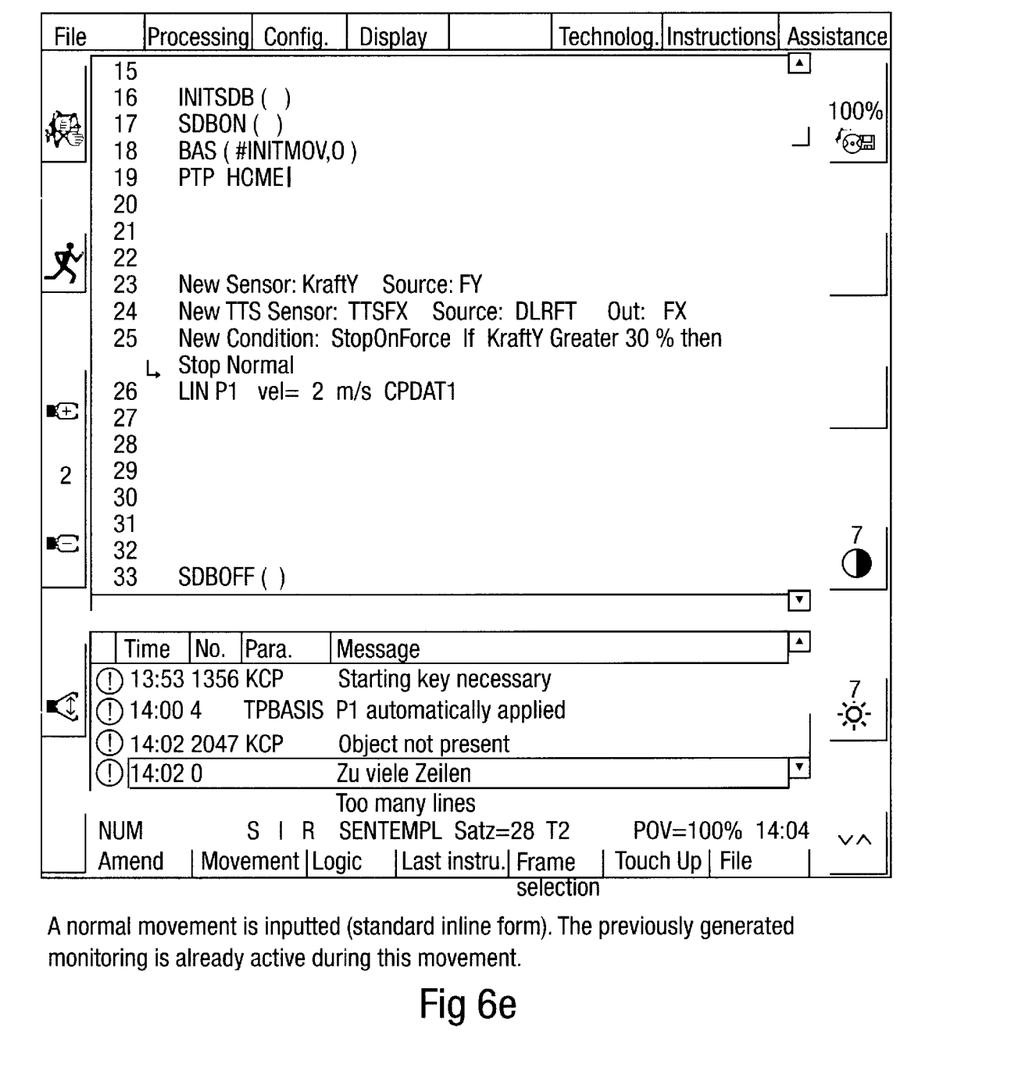
Figure 6F:
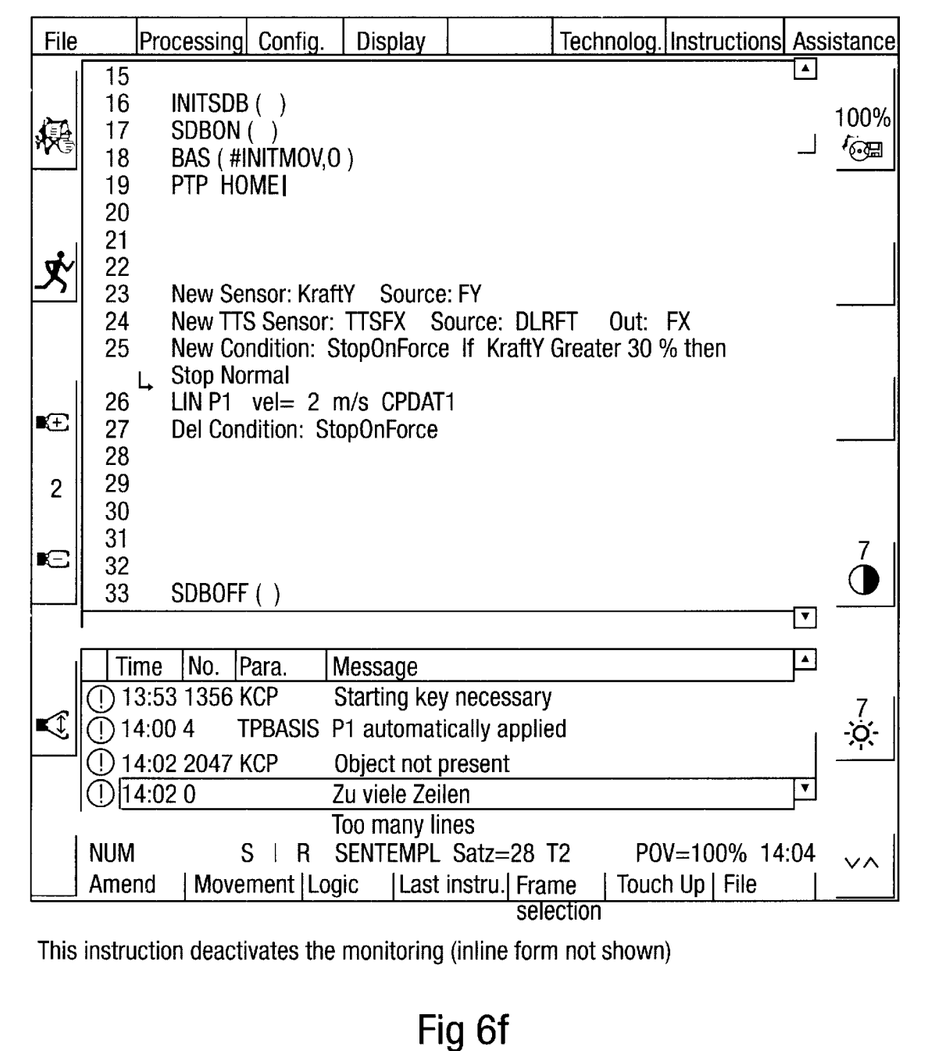
Figure 6G:
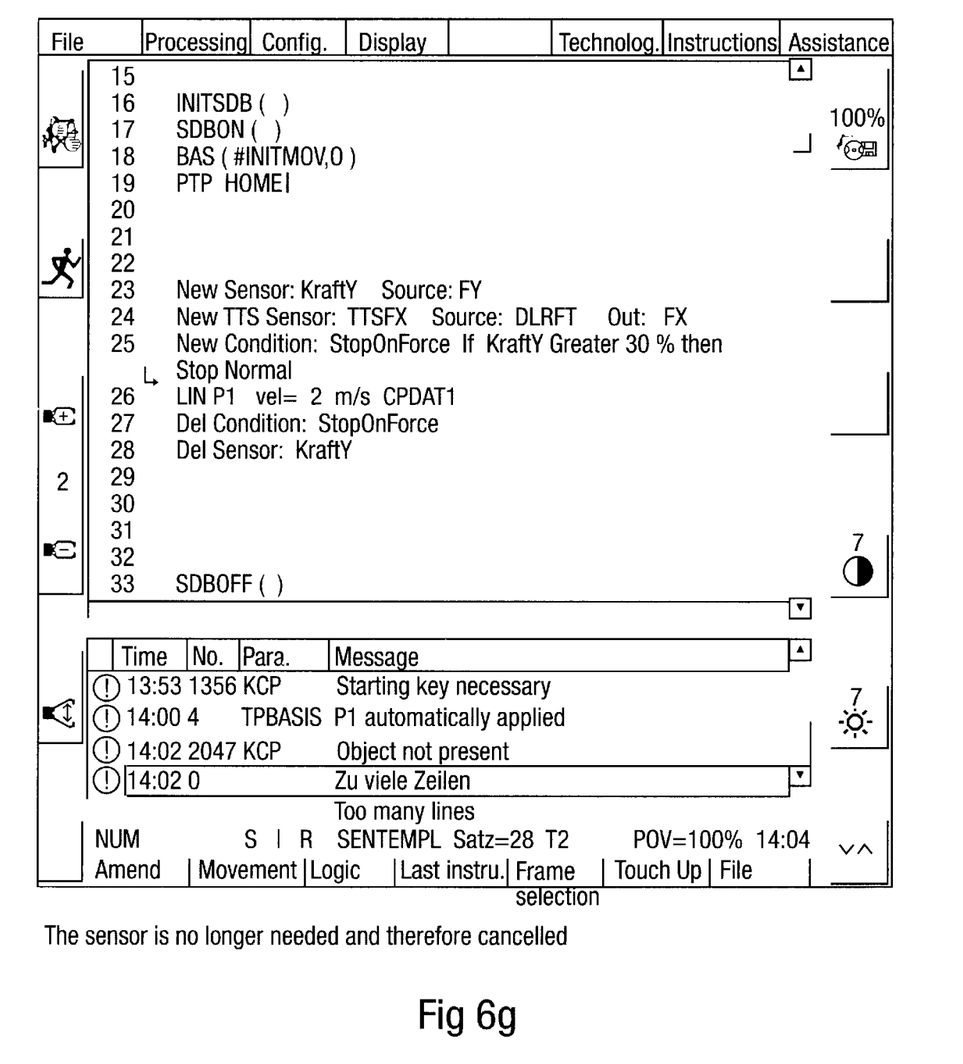
Figure 7:
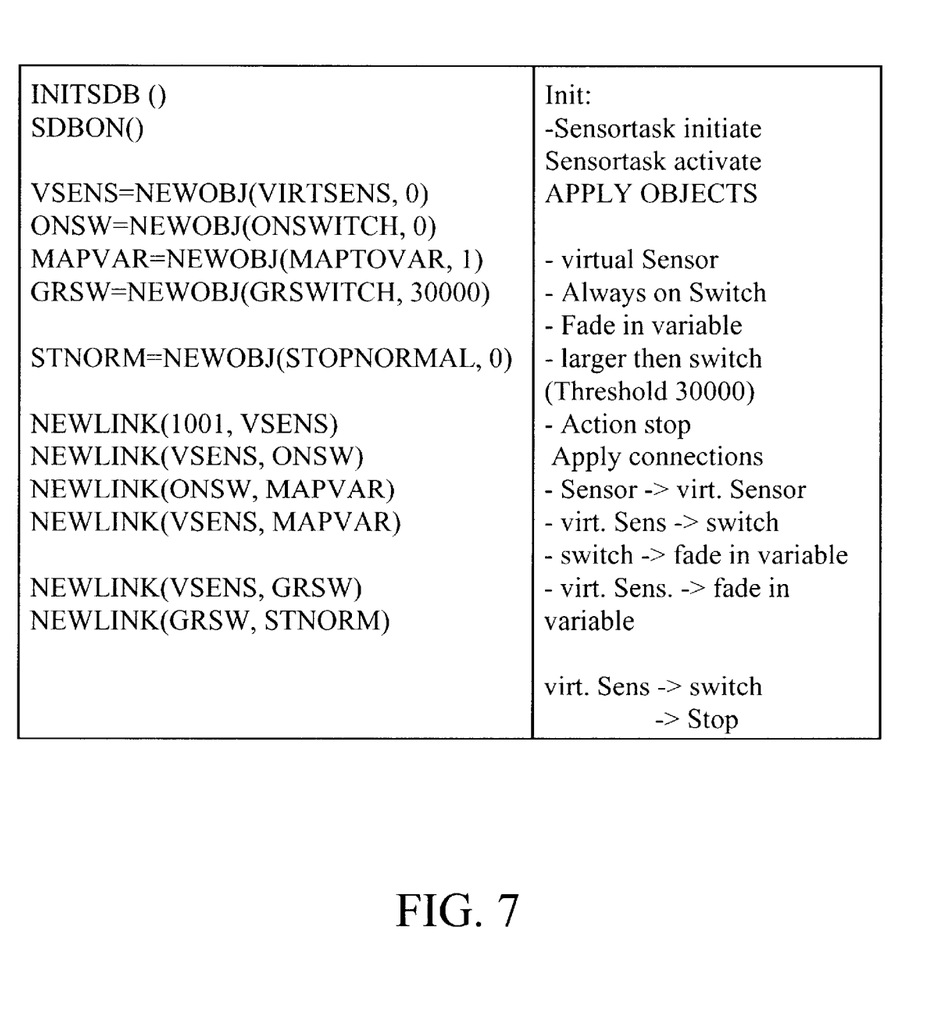
FIG. 7 The source code of the simple sensor program produced according to the sequence of FIGS. 6a to 6g or directly by an expert.
Figure 8:
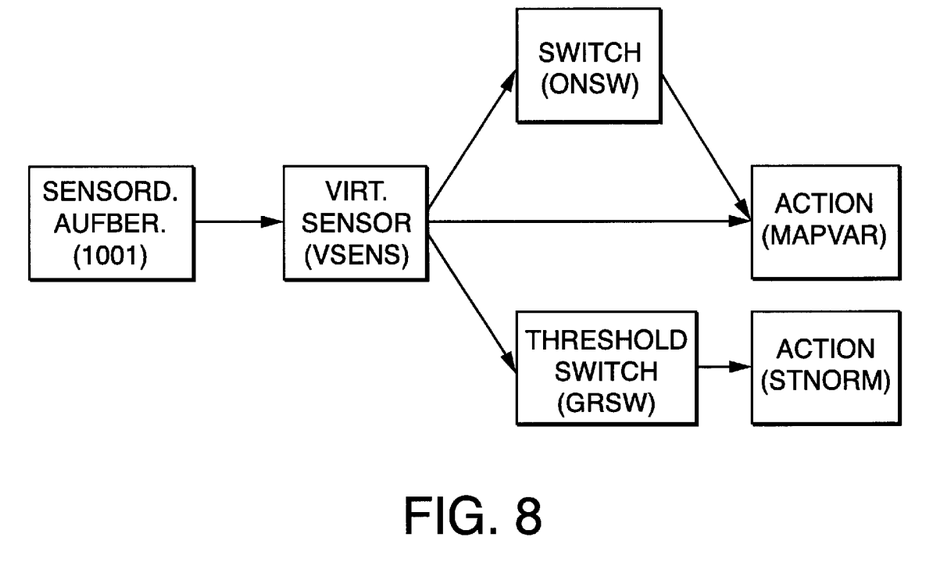
FIG. 8 The structure in the system program applied by the latter.

FIGS. 6 to 8 relate to a virtual sensor for simple use, namely the tracking of an edge, whose position and direction are known with automatic stopping in the case of an undesired obstacle. For this purpose a force sensor must be applied measuring three forces in a Cartesian coordinate system. The forces are transformed into one force in the robot movement direction by a virtual sensor. If the real sensor strikes an edge, it has to be stopped and then a further movement takes place in the approximate edge direction. For following the edge it is necessary to transform the forces into a single force transversely to the robot movement direction using a virtual sensor, the transverse force being used for tracking the robot at the edge by a control algorithm.

FIG. 6a firstly shows an empty program part. The user firstly chooses the technology to be employed by means of the "Technolog" by means of the selection button on the upper edge of the screen and is then offered a number of functions under this technology. From this he chooses a new sensor given the name KraftY (FIG. 6b). FIG. 6c shows the application of a sensor, which involves a path-accompanying recording of the force in the Y-direction of the connected DLRFT-type sensor. It is then shown how the reaction condition is reapplied with the frame "stop on force". If the recorded force value in the Y-direction exceeds 30% of the maximum value, the robot immediately stops.

FIG. 6d shows that within the frame of the inline forms the user is offered a number of possibilities by clicking on the inline mask lined up for processing, i.e. the percentage whose exceeding of the maximum value initiates a function and the nature of the function, here normal stopping is selected. FIG. 6e shows the inputting of a normal movement, the previously generated monitoring already being active in this movement. Subsequently (FIG. 6f) monitoring can be deactivated by the instruction "DEL Condition: Stop on force", the inline form by means of which deactivation is selected is not shown. With the instruction "Delete Sensor: KraftY" shown in FIG. 6d, the sensor is cancelled if it is no longer required.

FIG. 7 shows a source code inputting in this way or by the direct input of an expert, indicating the functions in the individual lines of the source code program.

FIG. 8 shows the structure in the system program applied by the latter.

LIST OF REFERENCE NUMERALS

1 Control according to the invention
2 Control program
2' Pseudo-sensors
3 Robot
4 Operating surface
5 User
6 Sensors
7 Drivers
8 Sensor frame program
11 Strategy selection
12 Linking unit
13 Converting device
14 Filter
15 Threshold switch
16 Linking unit
17 Control unit
18 Integrator
22, 22', 22" Switch
23 Actuator unit

What is claimed is:

1. Method for controlling a robot on the basis of sensor data from sensors with their own sensor data structures, characterized in that the sensor data are processed into robot control data of a control data structure usable by a control program.

2. Method according to claim 1, characterized in that the sensor data are converted into check data with a standardized data structure.

3. Method according to claim 2, characterized in that the check data are processed by suitable processing operations to actuator data.

4. Method according to claim 3, characterized in that the actuator data are checked and possibly limited and transferred as robot control data to the robot control program.

5. Method according to claim 1, characterized in that internal data of the robot control are converted into check data with a standardized data structure.

6. Method according to claim 1, characterized in that sensor, check, actuator and/or robot control data are processed with different clock cycles.

7. Method according to claim 6, characterized in that when processing the sensor, check, actuator and/or robot control data an averaging and/or filtering is performed.

8. Method according to claim 1, characterized in that sensor data of several sensors are processed in parallel.

9. Method according to claim 1, characterized in that data of one sensor are evaluated in parallel by means of different evaluation strategies.

10. Method according to claim 9, characterized in that the data obtained according to a specific evaluation strategy are transferred to the control program for use thereon as a function of specific events.

11. Device for controlling a robot on the basis of sensor data from sensors with their own sensor data structures, characterized in that a processing means is provided for processing the sensor data to robot control data of a control data structure usable by a control program.

12. Device according to claim 11, characterized in that there is a device for converting the sensor data into check data with a standardized data structure.

13. Device according to claim 12, characterized in that a control unit is provided for processing check data by suitable processing operations to actuator data.

14. Device according to claim 13, characterized in that an actuator means is provided for checking the actuator data, optionally for limiting the same and for transfer as robot control data to the robot control program.

15. Device according to claim 11, characterized in that devices are provided for converting internal data of the robot control into check data with a standardized data structure.

16. Device according to claim 11, characterized in that timers are provided with mutually independent output clock cycles for the individual processing means.

17. Device according to claim 11, characterized by devices for averaging and/or filtering the sensor, check, actuator and/or robot control data, particularly when processing the same with different clock cycles.

18. Device according to claim 11, characterized in that several processing paths are provided for the parallel processing of sensor data of several sensors.

19. Device according to claim 11, characterized in that several processing paths are provided for the parallel processing of sensor data of one sensor by means of different evaluation strategies.

20. Device according to claim 11, characterized by hierarchically constructed control modules.

21. Device according to claim 20, characterized by a plane of modules for the selection of a virtual sensor type.

22. Device according to claim 20, characterized in that modules are provided having actions to be monitored by a virtual sensor.

23. Device according to claim 20, characterized by modules for fixing the actions of implementing parameters.

24. Device according to claim 11, characterized by an operator surface constructed in hierarchic and modular manner.

25. Device, characterized by a switching means (9) for activating or deactivating processing paths as a function of one or more conditions.

* * * * *